July 7, 1964  MOTOAKI YOKOI  3,139,722

ROTARY PISTON TYPE COMPOUND INTERNAL COMBUSTION ENGINES

Filed March 6, 1962  4 Sheets-Sheet 1

INVENTOR
MOTOAKI YOKOI
BY Paul M. Craig, Jr.
ATTORNEY

INVENTOR
MOTOAKI YOKOI
BY Paul M. Craig, Jr.
ATTORNEY

INVENTOR
MOTOAKI YOKOI
BY Paul M. Craig, Jr.
ATTORNEY

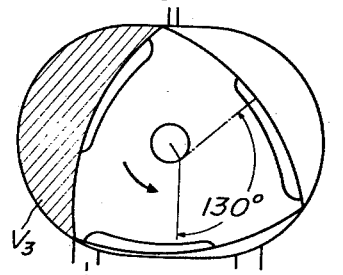
Fig. 10
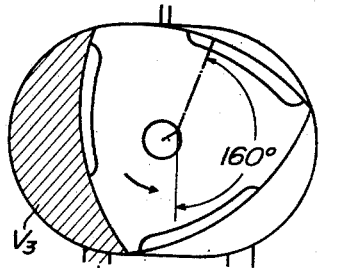
Fig. 11
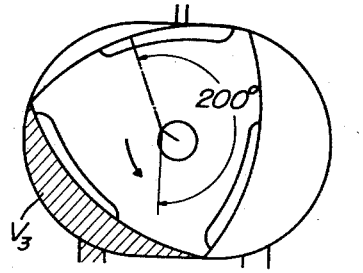
Fig. 12
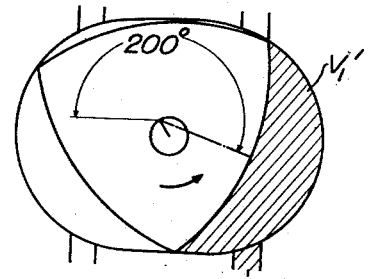

United States Patent Office 3,139,722
Patented July 7, 1964

3,139,722
ROTARY PISTON TYPE COMPOUND INTERNAL COMBUSTION ENGINES
Motoaki Yokoi, Ashiya-shi, Japan, assignor to Yanmar Diesel Engine Co., Ltd., Osaka, Japan, a corporation of Japan
Filed Mar. 6, 1962, Ser. No. 177,807
Claims priority, application Japan Mar. 10, 1961
2 Claims. (Cl. 60—15)

The present invention relates to rotary piston type internal combustion engines and particularly to those of the so-called revolution type.

Rotary piston type internal combustion engines generally employ substantially polygonal rotors which are each journalled in a casing having an inner periphery of a multi-lobe epitrochoid, and most commonly of a double-lobe epitrochoid eccentrically with respect to the central axis thereof. This type of internal combustion engines has in general a maximum compression ratio theoretically determined by the so-called $R/e$ ratio, that is, the ratio of the arm length or the largest radius of the rotor to the eccentricity. The present invention has for its object to increase the actual compression ratio of internal combustion engines of this kind to obtain compact and highly efficient engines without increasing the $R/e$ ratio to an extreme extent.

To this end, according to the present invention, a rotary piston internal combustion engine unit is combined with a second rotary piston unit of the same type and constructed integrally with the former, the second unit serving as an air compressor for supplying the first unit with compressed air through the suction port thereof, while the exhaust gas from the internal combustion engine unit is introduced into the fluid working chamber of the air compressor to expand thereby to strengthen the torque of the engine unit.

The present invention will now be described with reference to the accompanying drawings which illustrate one embodiment of the invention.

FIGS. 4 to 12 illustrate a pair of rotors incorporated in the apparatus assuming respective angular positions therein.

Figure 1:
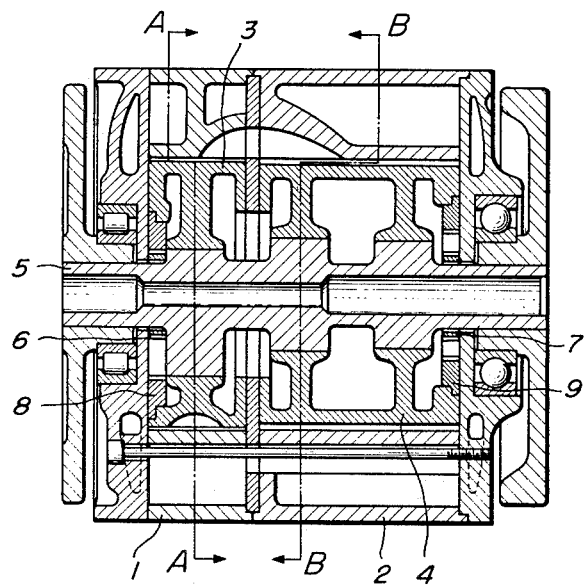
FIG. 1 is a longitudinal cross section of the inventive apparatus.

Referring to FIG. 1, numerals 1 and 2 denote casings having each an interior profile having two approximately epitrochoidal lobes and each accommodating a rotor 3 or 4. A rotary shaft 5 extends through the casings axially thereof.

The rotors 3 and 4, having each a profile including three edges and three predetermined curved surfaces are each rotatable on an axis offset from the axis of rotation of the rotary shaft 5, all edges of the two rotors being continually in sliding engagement with the inner surfaces of the respective casings.

The axes of rotations of the respective rotors on the rotary shaft 5 are spaced apart from each other by an angular distance of 90 degrees. Fixed to the rotors are respective internal gears 8 and 9, which are in mesh with respective stationary pinions 6 and 7 so that the rotors are rotated in the same directions as the rotary shaft 5 in the ratio of 3 to 1.

Figure 2:
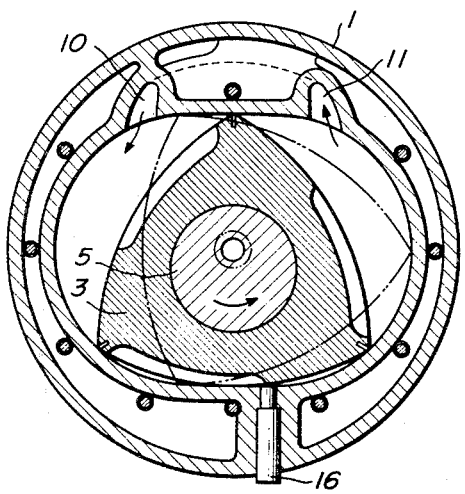
FIG. 2 is a cross section taken along the line A—A in FIG. 1.
Figure 3:
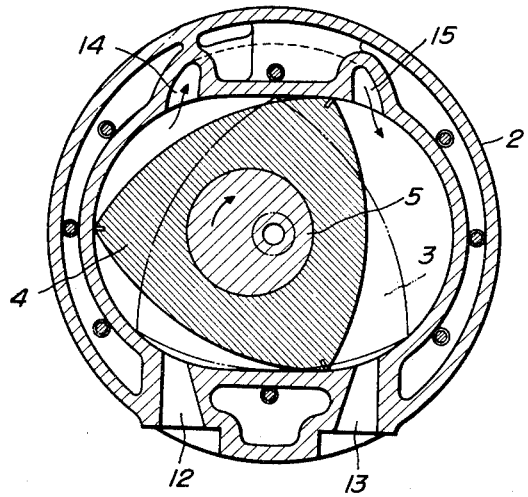
FIG. 3 is a cross section taken along the line B—B in FIG. 1.

Referring to FIG. 2, 10 denotes an inlet port through which fresh air is charged; 11 denotes an exit port through which hot gas is discharged; and 16 denotes a fuel injection valve. Referring next to FIG. 3, 12 denotes a suction port through which fresh air is drawn in; 14 denotes a fresh air delivery port; 15 denotes a hot gas inlet port; and 13 denotes a discharge port for cold gas. Of these openings, the fresh air delivery port 14 and the hot gas exit 11 communicate by way of appropriate passageways with the fresh air inlet 10 and hot gas inlet 15, respectively.

The operative process of the inventive apparatus will now be described with reference to FIGS. 4 to 12, inclusive. In these figures, the first stage expanding unit is shown above and the second stage expanding unit is shown below. The direction of rotation of the rotary shaft and the rotors is indicated by the arrow in the respective figures.

Figure 4:
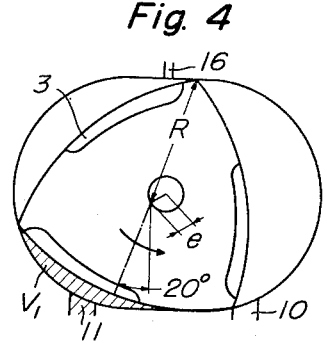
Figure 4:
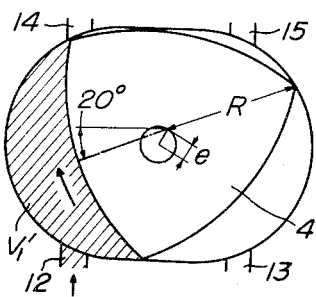

FIG. 4 shows the rotors in respective positions immediately before the working chamber $V_1'$ of the second stage expanding unit is placed in communication with the fresh air delivery port 14. At this time, the working chamber $V_1$ of the first stage expanding unit is also just about to communicate with the fresh air inlet 10. Also, the working chamber $V_1'$ on the second stage side is increasing in volume, continuingly drawing in fresh air through the fresh air suction port 12.

Figure 5:
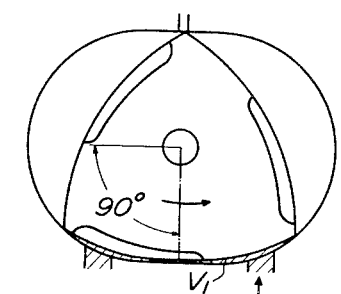
Figure 5:
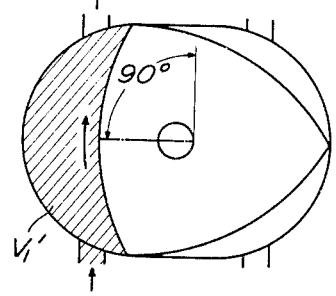

FIG. 5 shows the relative positions of the rotors when the working chamber $V_1'$ on the second stage side has the maximum volume during the stroke and the working chamber $V_1$ on the first stage side has the minimum volume. Theoretically, delivery of fresh air is started at this moment from the second stage to the first stage. Only, at this moment, the fresh air suction port 12 is still open allowing the suction of fresh air to continue under the inertia effect of its own.

Figure 6:
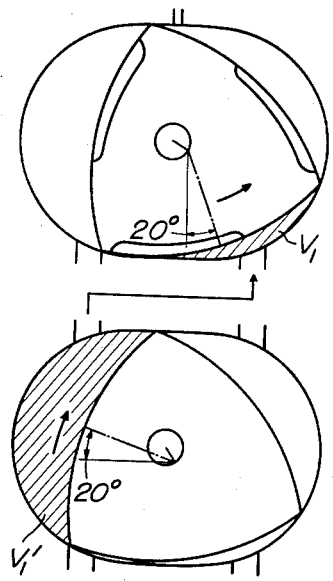

FIG. 6 corresponds to that instant when the fresh air suction 12 is closed. At this moment, the suction of fresh air into the second stage side working chamber is substantially interrupted.

Figure 7:
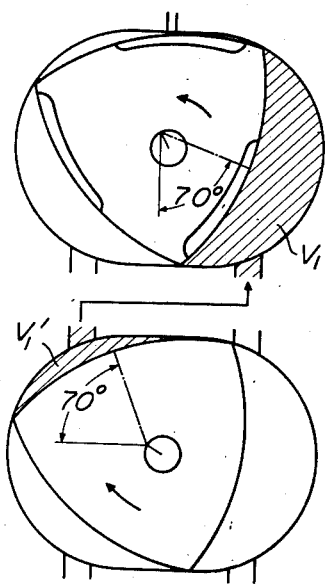

The relative positions of the rotors just before the second stage working chamber $V_1'$ is in communication with the hot gas inlet port 15 are shown in FIG. 7. At this moment, the second stage side working chamber $V_1'$ is still decreasing in volume whereas the first stage side working chamber $V_1$ is increasing its volume, and thus the delivery of fresh air from the first stage to the second stage is continuing with the two working chambers held in communication with each other.

Figure 8:
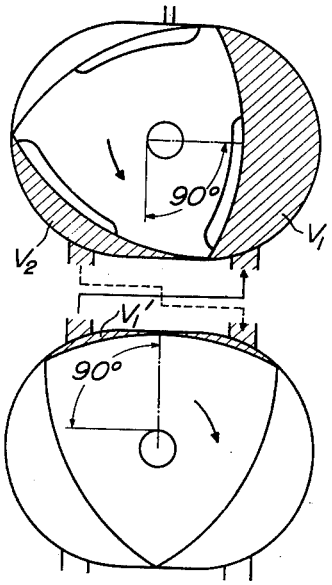

FIG. 8 illustrates the rotors in respective positions taken thereby when the volume of the second stage side working chamber $V_1'$ is at its minimum during the stroke and the first stage side working chamber $V_1$ has its maximum volume. Theoretically, the charging of fresh air into the first stage side working chamber is interrupted at this moment. With such arrangement, it will be appreciated that the amount of fresh air remaining in idle spaces such as the second stage side working chamber and the passageway interconnecting the working chambers on the respective stages is minimized to give an improved charging efficiency as compared with conventional arrangements since the fresh air charged is at a minimized pressure for its amount when the charging has been completed.

On the other hand, at this moment, the first stage working chamber $V_2$ and the second stage side working chamber $V_1'$ are connected as indicated by a broken line, starting gas flow the first stage side to the second stage side and hence re-expansion of the gas in the second stage side working chamber $V_1'$.

Figure 9:
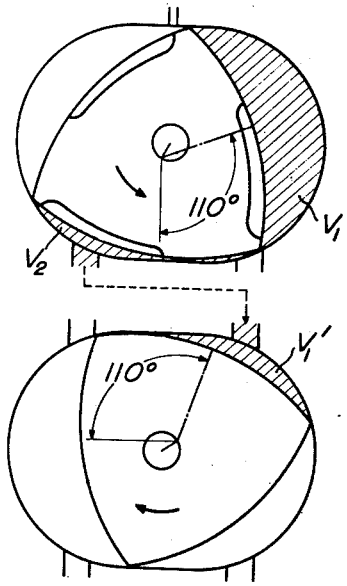

FIG. 9 is a showing corresponding to the instant when the fresh air charging port 10 into the first stage working chamber $V_1$ is closed to start the compression stroke therein. The working chamber $V_1$ will thereafter follow an ordinary working process including explosion, expansion and discharging.

Immediately before the members assume their positions as shown in FIG. 9, that is, immediately before the fresh air charging port 10 is closed, the fresh air delivery port 14 of the second stage unit as well as the charging port 10 is open so that there exists a short "blow-back" period for the charged air. This "blow-back" period does not exist where the axis of rotation of the respective rotors are angularly spaced from each other by an angle of approximately 60 degrees. From the foregoing, it will be understood that the highest fresh air charging efficiency is obtainable where the angular distance between the axis of rotation of the rotors on the rotary shaft 5 is in the range of from approximately 50 degrees to 120 degrees but preferably from 60 degrees to 90 degrees, considering the volume of fresh air remaining in the second stage side work chamber $V_1'$ and the inertia of the air stream.

FIG. 10 illustrates the rotors in their respective positions taken immediately before the hot gas exit 11 is in communication with the first stage side working chamber $V_3$.

FIG. 11 illustrates the state of parts just after the re-expansion of gas in the second stage side working chamber $V_1'$ has completed and before the cold gas discharging port 13 is opened.

FIG. 12 shows the process of discharging the cooled gas from the second stage side working chamber $V_1'$.

With the apparatus constructed and arranged as described above, a low compression ratio internal combustion engine (which corresponds to the first stage expanding unit of the illustrated apparatus) may advantageously be converted to a high compression ratio internal combustion engine by properly selecting a volume ratio between the first stage side working chambers and the second stage side working chambers without excessively increasing the ratio of the arm length R of the first stage rotor to the eccentricity thereof. In other words, according to the present invention, a compression ignition internal combustion engine of the rotary piston type is readily realized by obtaining a high compression ratio by combining rotary piston units (internal combustion engines or machines) of low compression ratio. It is well known that in case either of the suction and exhaust ports is arranged sidewise, an excessively large $R/e$ ratio diminishes the available areas of the suction and exhaust ports to be controlled by the rotor (corresponding to the rotor 3 of the first stage expanding unit) rendering it difficult to attain a satisfactory gas exchange.

In addition, even when diesel combustion be effected in the working chamber $V_1$ of the first stage expanding unit to increase the pressure of the combustion gases, the pressure difference between the pressure in the working chamber $V_1$ in which such combustion is being effected and that in the working chamber $V_2$ or $V_3$ is not so much elevated as with a single stage rotary diesel engine, which necessitates a considerably high $R/e$ ratio, since the pressure in the expanding working chamber $V_3$ is substantially elevated by incomplete expansion of high pressure gases therein. It will be appreciated, therefore, that, according to the present invention, the sealing between said working chambers may be effected with ease by the sealing elements disposed along the angular edges of the rotor 3.

What is claimed is:

1. A rotary piston type compound internal combustion engine comprising a pair of juxtaposed rotary piston units having a common rotary shaft and each including a casing having a multi-lobe epitrochoidal inner peripheral surface, said rotary shaft being journaled in said casing, and a rotor mounted on said rotary shaft eccentrically with respect thereto and rotatable at a predetermined ratio relative to said shaft, said rotor being substantially polygonal having edges cooperating with said inner periphery of said casing, it being arranged so that one of said rotary piston units operates as an internal combustion engine simultaneously while the other rotary piston unit operates as a compressor, and then said one rotary piston unit operates as the compressor for said other unit simultaneously while said other unit operates as an internal combustion engine the compressed air exit port of the second unit being in communication with the inlet port of the first unit, the exhaust gas from the first unit being introduced into the working chambers of the second unit to expand therein for the purpose of increasing the torque of the engine.

2. A rotary piston type compound internal combustion engine as set forth in claim 1 characterized in that said casings each have a double-lobe epitrochoidal inner peripheral surface and said rotors are each generally triangular, the axes of rotation of the rotors of the first and second units being angularly spaced apart by an angular distance of from approximately 50 degrees to 120 degrees.

References Cited in the file of this patent

UNITED STATES PATENTS

| | | |
|---|---|---|
| 2,037,450 | Bancroft | Apr. 14, 1936 |
| 2,993,482 | Froede | July 25, 1961 |

FOREIGN PATENTS

| | | |
|---|---|---|
| 6,360 | Norway | June 20, 1898 |